(12) United States Patent
Autissier et al.

(10) Patent No.: US 11,912,540 B2
(45) Date of Patent: Feb. 27, 2024

(54) RETURN SYSTEM FOR LIFTING HOOK AND HOOKING DEVICE COMPRISING SUCH A SYSTEM

(71) Applicant: LACE, Saint-Maur (FR)

(72) Inventors: Christophe Autissier, Briantes (FR); Yoann Schmidt, Guerande (FR)

(73) Assignee: LACE, Saint-Maur (FR)

( * ) Notice: Subject to any disclaimer, the term of this patent is extended or adjusted under 35 U.S.C. 154(b) by 783 days.

(21) Appl. No.: 16/770,611

(22) PCT Filed: Dec. 7, 2018

(86) PCT No.: PCT/EP2018/084007
§ 371 (c)(1),
(2) Date: Jun. 7, 2020

(87) PCT Pub. No.: WO2019/110812
PCT Pub. Date: Jun. 13, 2019

(65) Prior Publication Data
US 2020/0307962 A1   Oct. 1, 2020

(30) Foreign Application Priority Data
Dec. 8, 2017   (FR) ..................... 1761851

(51) Int. Cl.
  *B66C 1/36*   (2006.01)
  *F16F 1/12*   (2006.01)
  *F16F 3/04*   (2006.01)

(52) U.S. Cl.
  CPC ............... *B66C 1/36* (2013.01); *F16F 1/121* (2013.01); *F16F 3/04* (2013.01); *F16F 2228/08* (2013.01); *F16F 2230/0005* (2013.01)

(58) Field of Classification Search
  CPC .... B66C 1/36; B64D 1/22; F16F 1/121; F16F 3/04; F16F 2228/08; F16F 2230/0005
  See application file for complete search history.

(56) References Cited

U.S. PATENT DOCUMENTS

| | | | |
|---|---|---|---|
| 3,741,558 A | 6/1973 | Ochs | |
| 4,179,148 A * | 12/1979 | Johnson | ................. B63B 21/08 294/82.11 |

(Continued)

FOREIGN PATENT DOCUMENTS

| | | |
|---|---|---|
| EP | 1767808 | 3/2007 |
| FR | 2137404 | 12/1972 |

(Continued)

OTHER PUBLICATIONS

Talvitie, Risto, International Search Report, dated Feb. 4, 2019, 3 pages, European Patent Office, Rijswijk, Netherlands.

*Primary Examiner* — Thomas W Irvin
(74) *Attorney, Agent, or Firm* — Henricks Slavin LLP

(57) ABSTRACT

The present invention relates to a return system (10) intended to equip a hooking device comprising a housing and a load hook (30) mounted so as to be able to pivot relative to the housing, the return system being mounted between a rod (21) secured to said housing, and comprising at least one tension spring (11), a device for adjusting the force of each tension spring with a plate (12) and a connecting rod (13) adjustably attached to the plate, and a crank pin (14) situated at a free end of the connecting rod, each tension spring links the rod to said plate, the crank pin is attached to the load hook, and the return system exerts a return force on the load hook that allows said load hook to close. The present invention also relates to a hooking device equipped with such a return system.

9 Claims, 4 Drawing Sheets

(56) References Cited

U.S. PATENT DOCUMENTS

| | | | |
|---|---|---|---|
| 9,562,581 B2 * | 2/2017 | Yates | B64C 13/0421 |
| 9,657,771 B1 | 5/2017 | Trout | |
| 11,279,596 B2 * | 3/2022 | Autissier | B66C 1/36 |
| 11,434,110 B2 * | 9/2022 | Cranston | B66C 1/36 |
| 2014/0059901 A1 | 3/2014 | Nicoson | |
| 2015/0275998 A1 * | 10/2015 | Yates, Jr. | B64D 43/00 |
| | | | 244/17.11 |
| 2021/0047148 A1 * | 2/2021 | Autissier | B66C 1/36 |
| 2021/0253401 A1 * | 8/2021 | Cranston | B66C 1/36 |

FOREIGN PATENT DOCUMENTS

| | | | | |
|---|---|---|---|---|
| GB | 890178 | | 2/1962 | |
| GB | 2513646 | | 11/2014 | |
| GB | 2513646 A | * | 11/2014 | B64D 1/22 |
| JP | S5364356 | | 6/1978 | |
| WO | WO 2010/119402 | | 10/2010 | |

* cited by examiner

RETURN SYSTEM FOR LIFTING HOOK AND HOOKING DEVICE COMPRISING SUCH A SYSTEM

CROSS REFERENCE TO RELATED APPLICATIONS

This application is a National Stage of International Application No. PCT/EP2018/084007, filed Dec. 7, 2018, which claims priority from FR1761851 filed Dec. 8, 2017, the entire contents of which are incorporated herein by reference.

TECHNICAL FIELD

The present invention belongs to the field of load hooking devices for lifting apparatuses, and more particularly relates to a return system for the load hooks of hooking devices (or "cargo hook" in Anglo-Saxon terminology) used in helicopters.

STATE OF THE ART

Springs are known to be used in the hooking devices to return the load hooks in position. This return generally corresponds to the closing of the load hook after the transported load is dropped.

For this purpose, the hooking devices comprise a spring, usually tension, mounted between the housing of the hooking device and the load hook.

The document GB 2513646A describes a hooking device comprising such a return spring, the spring is placed horizontally between a point of attachment of the housing and a point of attachment of the hook located at the tilting axis of said hook. This arrangement induces a distortion of the spring when the latter works in order to return the open hook to its closed position. The spring therefore does not work under compression only and can be subject to premature failure or damage for which it has not been sized.

The document FR 2137404 also describes a load hook equipped with an inclined return spring connecting the hook to the housing.

The existing solutions have other disadvantages such as limited stiffness that does not secure the closure of the load hook at the maximum, and a portion of the spring, at least, located outside the housing and the hook and directly exposed to external aggressions such as sand and moisture.

On the other side, the return springs provided on the hooking devices are not adjustable in preload. They have the same effective stiffness which cannot be modified according to the requirements of the mission, for example.

Presentation of the Invention

The invention relates in particular to a system for returning the load hook of a hooking device which brings an improvement to existing systems with regard to the problems mentioned above.

The return system according to the invention, intended to equip a hooking device comprising a housing and a load hook mounted so as to pivot relative to the housing, comprises an elastic means mounted between a rod integral with said housing and a crank pin fixed to the load hook, said return system being capable of exerting a return force on the load hook in order to allow the load hook to be closed.

The return system further comprises a device for adjusting the restoring force of the elastic means.

In this way, a load hook return system is provided, the restoring force of which can be adjusted and modified without changing the element of the return system or the hooking device.

In one embodiment, the device for adjusting the return force of the elastic means comprises a plate connected to the elastic means and a connecting rod cooperating with said plate, the connecting rod passing through a hole of the plate and comprising a threaded part connected to the crank pin and an adjusting nut screwed onto a portion of the threaded part, the adjusting nut bearing on the plate, the tightening of the adjusting nut allowing adjustment of an elongation of the elastic means.

It is thus possible to adjust a pre-tension of the elastic means in order to ensure, in particular, the minimum intensity of the restoring force.

In one embodiment, the elastic means comprises at least one tension spring.

In a particular embodiment, the elastic means comprises at least two tension springs mounted in parallel. Such a mounting improves the safety of the return of the hook in the event of a spring failure.

In one embodiment using one or more tension springs, each tension spring has contiguous coils, when not subjected to an elongation force, and comprises an upper hook by which said spring is suspended in a groove of the rod.

In one embodiment using one or more tension springs, each tension spring comprises a lower hook which cooperates with recesses made in the plate, said plate being suspended from the tension springs.

In one embodiment, the connecting rod includes a curved portion terminating in a hole traversed by the crank pin, the crank pin and the connecting rod forming a sliding pivot connection.

The invention also relates to a load hooking device for a lifting apparatus comprising a housing and a load hook pivotably mounted with respect to the housing, and comprising a system for returning the load hook according to the invention.

In one embodiment of this fastening device, the load hook is mounted so as to pivot about a tilt axis and comprises a recess in which a portion of the return system is housed, the recess having a length that allows the load hook to be tilted between a closed position and an open position in the presence of the portion of the return system in said recess.

It is thus ensured that the return system operates in a correct manner in tension.

In one embodiment of the fastening device, the load hook is fastened to the crank pin of the return system along an axis offset with respect to the tilting axis of the load hook.

BRIEF DESCRIPTION OF THE FIGURES

The different figures as well as the elements of the same figure are not necessarily shown on the same scale. In all of the figures, the identical elements bear the same reference frame.

It is thus illustrated by.

DETAILED DESCRIPTION OF EMBODIMENTS

In the embodiment described below, reference is made to a hooking device intended mainly for the transport of loads by helicopter. This example is in no way exclusive of applications to lifting and transporting loads by other apparatuses.

Such a hooking device is usually connected to a helicopter which comprises at this end fastening means such as, for example, a clevis, a bearing or bores. The hooking device then allows the suspension of the load to be transported, via a lifting attachment such as a ring or shackle.

Figure 1:
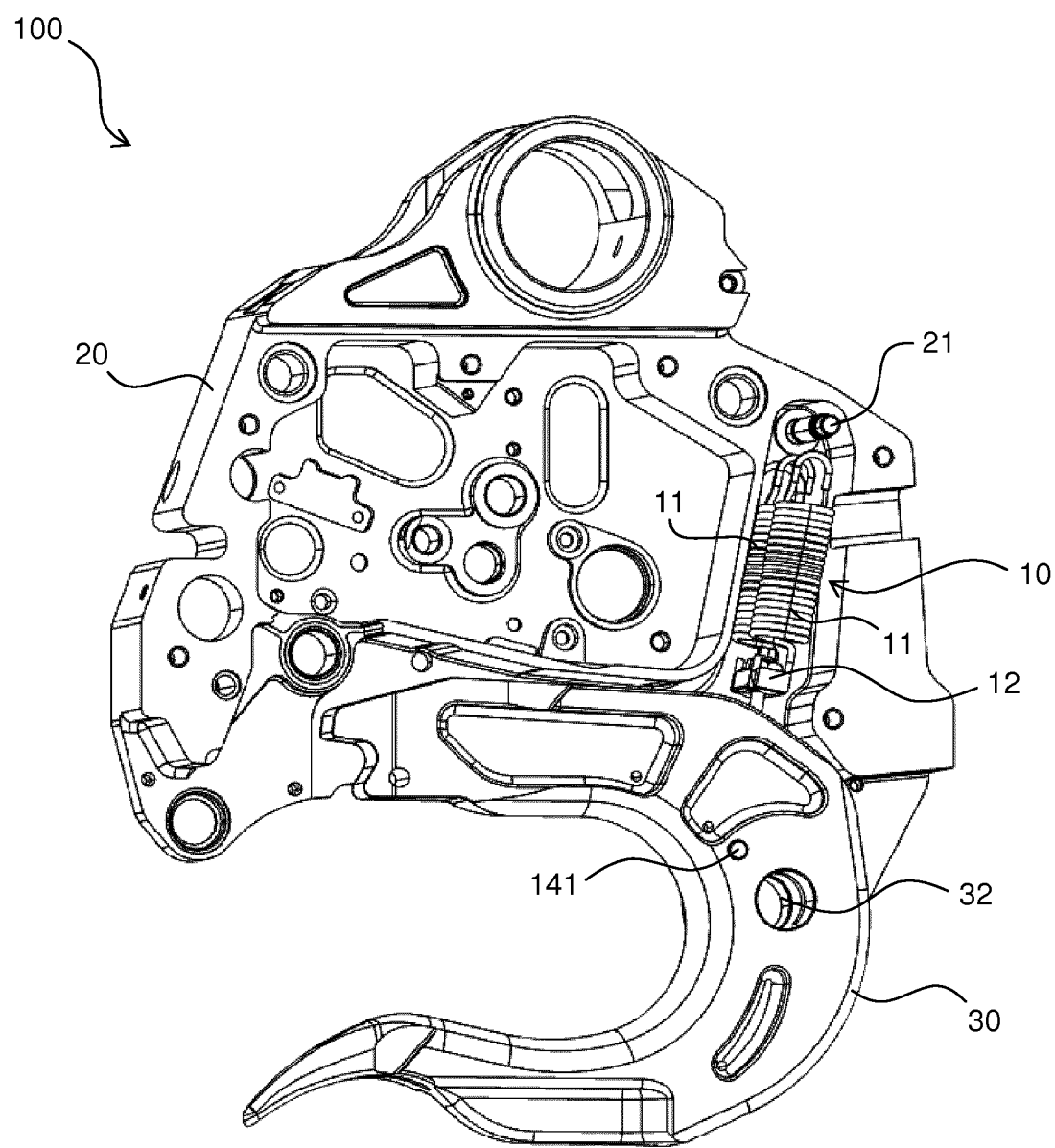
FIG. 1: a partial perspective view of a hooking device equipped with a system for returning the hook according to one embodiment of the invention.

FIG. 1 represents a partial view of a fastening device 100 comprising a return system 10, a housing 20 and a load hook 30, the load hook being pivotably mounted in the housing 20 and the return system 10 making it possible to return the load hook 30 in position relative to the housing. The hooking device further comprises other components which do not directly cooperate with the return system 10, which is the subject of the present invention, and which are known to a person skilled in the art such as the safety catch and the locking unlocking mechanism of the load hook. These elements are not shown in the drawings.

The return system 10 is placed between a transverse rod 21 secured to the housing 20 and the load hook 30, said transverse rod being arranged perpendicularly to a front plane of said housing.

Figure 2:
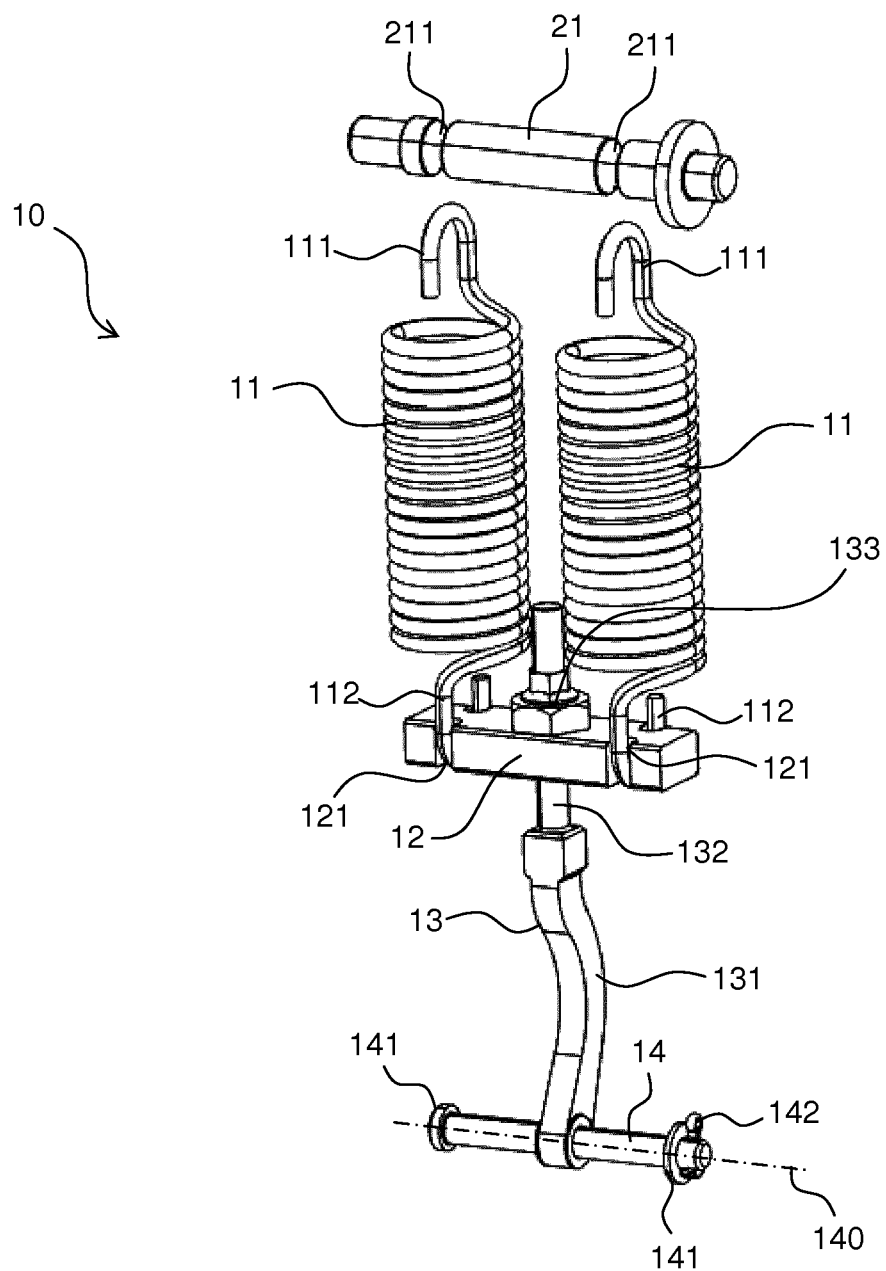
FIG. 2: a perspective view of the return system of FIG. 1.

FIG. 2 shows the return system 10 according to an exemplary embodiment of the invention, the return system mainly comprises two tension springs 11, a rectangular plate 12, a connecting rod 13 and a transverse crank pin 14.

According to the exemplary embodiment illustrated, the tension springs 11 are mounted in parallel between the transverse rod 21 and the rectangular plate 12, each of said springs being at contiguous coils comprising an upper hook 111 and a lower hook 112.

The transverse rod 21 comprises two grooves 211 adapted to hold the upper hooks 111 of the springs 11. Thus, the tension springs 11 are suspended from the transverse rod 21 via the upper hooks 111 each of which is placed in a groove 211 of said transverse rod. The grooves 211 limit the transverse play of the tension springs 11 relative to the transverse rod 21.

Figures 5A, 5B:
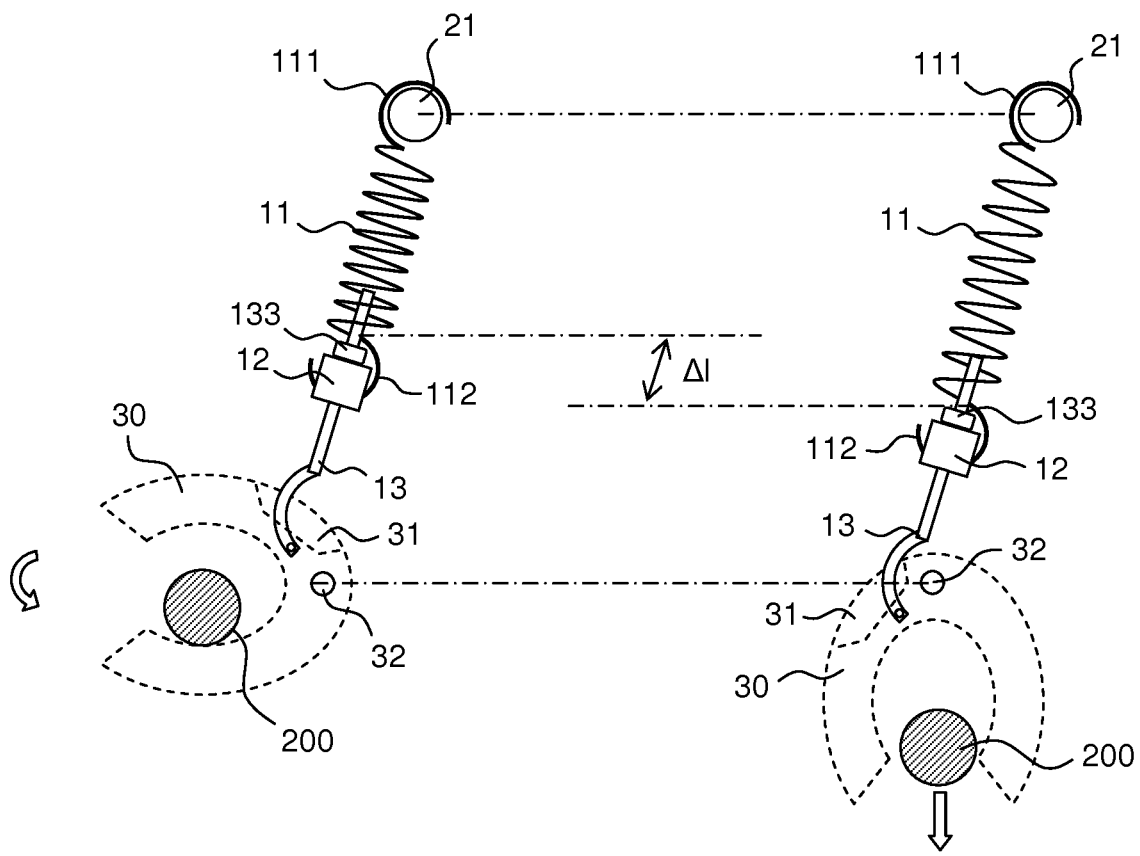
FIGS. 5a and 5b: diagrams of the return system when the load hook is closed, FIG. 5a, and when the latter is open, FIG. 5b.

In all of the figures except in FIGS. 5a and 5b, the tension springs 11 are shown at rest, and therefore separated from the transverse rod 21 to which they are normally suspended by being tensioned, in order to better represent their elongation, or length, unloaded.

The springs 11 are mounted tensioned, or pre-loaded, between the housing 20 and the load hook 30 in order to secure the closed position of the load hook by means of a restoring force exerted permanently on said load hook.

The rectangular plate 12, according to the exemplary embodiment illustrated, is suspended from the tension springs 11 by means of recesses 121 produced for this purpose in said rectangular plate. Each lower hook 112 is placed in two recesses 121 facing one end of the rectangular plate 12, each recess being a lateral groove opening between a lower face and an upper face of said rectangular plate.

The connecting rod 13, according to the exemplary embodiment illustrated, comprises a curved portion 131 and a straight threaded portion 132, the threaded portion is inserted into a central hole of the rectangular plate 12 and is fixed to said plate by an adjustment nut 133 which is screwed onto the thread of said threaded portion. The assembly formed by the adjustment nut 133 and the threaded part 132 makes it possible to adjust the preload of the tension springs 11 by adjusting the distance between the transverse rod 21 and the plate 12.

In fact, the tightening of the adjustment nut 133 produces a downward displacement of the rectangular plate 12 thus increasing the elongation of the tension springs 11 suspended from the transverse rod 21. The usefulness of this preloading adjustment will be detailed later in the description.

The curved part 131 of the connecting rod 13 is connected to the crank pin 14, said crank pin being mounted in a sliding pivot, of axis 140, in a hole provided in the free end of said curved part.

The crank pin 14, according to the exemplary embodiment illustrated, is mounted in the load hook 30, immobilized in translation with respect to said load hook but free in rotation about its axis 140.

Figure 3:
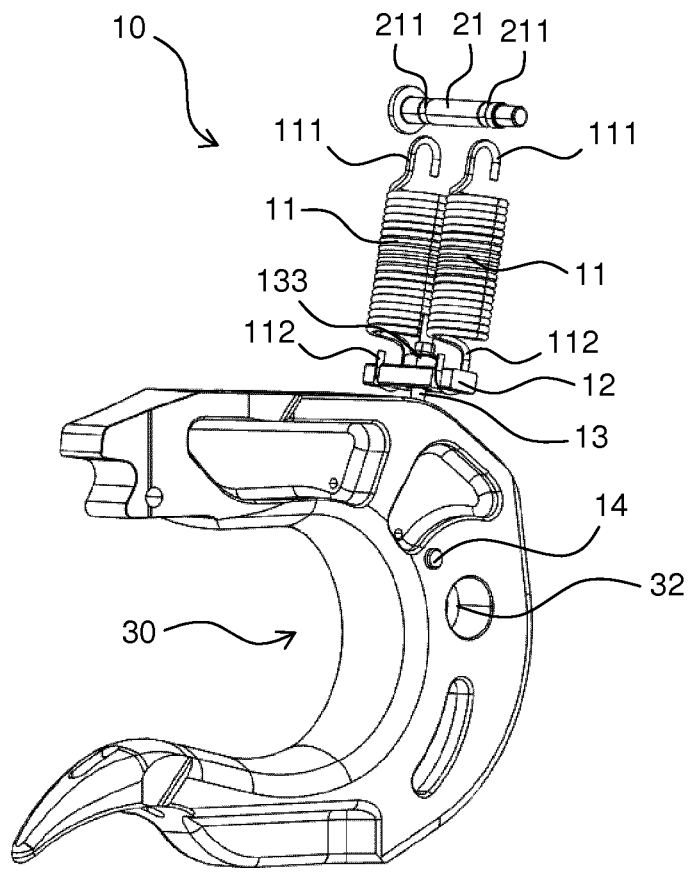
FIG. 3: a perspective view of the return system coupled to the hook of the hooking device.
Figure 4:
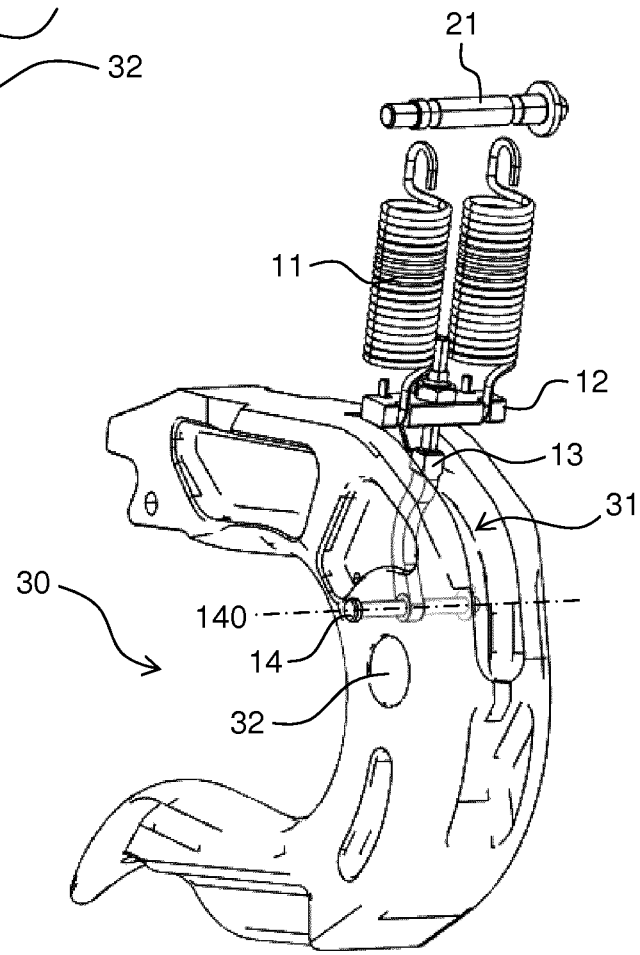
FIG. 4: another perspective view of the return system coupled to the hook, the hook being transparent to allow the connecting rod and the crank pin of the return system to be viewed.

FIGS. 3 and 4 show the return system 10 coupled to the load hook 30. The load hook 30 comprises a recess 31, visible in FIG. 4, suitable for mounting the connecting rod 13 and the crank pin 14 in said load hook.

In a known manner, the load hook 30 is pivotably mounted in the housing 20 in relation to a tilting axis 32.

The recess 31 of the load hook 30 has a useful length allowing the displacement of the connecting rod 13 in said recess when the load hook 30 pivots about its tilting axis 32. The recess 31 further has a width allowing a determined transverse play of the connecting rod 13 mounted in sliding pivot relative to the crank pin 14.

The crank pin 14, according to the exemplary embodiment illustrated, comprises a collar 141 at each of its ends, the collars 141 blocking, to a functional clearance, the return system 10 in the load hook 30.

According to an exemplary embodiment, one of the collars 141 is dismountable to allow the pin 14 of the hook 30 to be removed, and is thus blocked by a pin 142 as shown in FIG. 2.

FIG. 5a schematically represents the return system 10 just before the opening of the hook 30, the opening of said hook being controlled by an unlocking locking mechanism (not shown). In this case, the springs 11 in this case have an initial elongation previously set with the adjustment nut 133.

FIG. 5b schematically represents the state of the return system 10 when the load hook 30 is in the open position, the open position corresponding to the release of a load not shown hooked via a lifting device 200. When the load hook 30 is unlocked, the force that the load exerts on it causes it to tilt downwards about its tilting axis 32. This tilting produces a circular translation of the crank pin 14, the axis 140 of which is offset with respect to the tilting axis 32, about the tilting axis 32, like the movement of a nacelle of a wheel carrousel. The movement of the crank pin drives a displacement of the connecting rod 13 and of the plate 12 of the return system 10, thus inducing an elongation of the springs 11 of a length $\Delta l$ with respect to their initial elongation.

As soon as the load hook is completely released from the lifting accessory, said hook tilts upwards drawn by the crank pin under the effect of the return force exerted by the return system on said load hook.

In the light of the proportionality law between the return force and the elongation in a spring, the greater the springs 11 elongation, the greater the return force exerted on the hook. As a result, the tightening of the adjustment nut 133 makes it possible to increase the initial elongation of the springs and thus to increase the return force of said springs. This adjustment makes it possible, for example, to increase or decrease the closing speed of the hook as a function of the mass thereof.

In addition to the load distribution, another advantage of the present invention is the stability provided by two springs arranged in parallel instead of a single spring as being used in known hooking devices.

This arrangement, with four points of attachment which are the upper 111 and lower 112 hooks of the two springs 11, makes the system hyperstatic. Furthermore, the parallel mounting of the springs makes it possible to obtain a system with an equivalent stiffness which is the sum of the stiffnesses.

However, this arrangement is in no way obligatory and the return system according to the invention can operate with a single spring provided that the preload of said spring is adjustable by means of a nut which is screwed onto a threaded portion integral with the spring as described, or by any other means available to a person skilled in the art.

The invention claimed is:

1. A device for hooking loads for a lifting apparatus comprising a housing and a load hook mounted so as to pivot relative to the housing, wherein the return system comprises a housing and a load hook mounted so as to pivot relative to the housing, the return system comprising an elastic means mounted between a rod secured to said housing and a crank pin fixed to said load hook, said return system being capable of exerting a return force on the load hook in order to allow said load hook to be closed in the housing, characterised in that the return system further comprises a device for adjusting the return force of the elastic means wherein the device for adjusting is configured to provide a complete adjustment through a single element for adjusting.

2. Return system according to claim 1, wherein the adjustment device of the return force of the elastic means comprises a plate connected to the elastic means and a connecting rod cooperating with said plate, the connecting rod passing through a hole of the plate and comprising a threaded portion connected to the crank pin and an adjustment nut screwed onto a portion of said threaded portion, the adjustment nut resting on the plate, the tightening of said adjustment nut making it possible to adjust an elongation of the elastic means.

3. Return system according to claim 2, wherein the connecting rod comprises a curved part ending in a hole traversed by the crank pin, said crank pin and said connecting rod forming a sliding pivot connection.

4. Return system according to claim 1, wherein the elastic means comprises at least one tension spring.

5. Return system according to claim 4, wherein each tension spring has contiguous coils and comprises an upper hook through which said spring is suspended in a groove of the rod.

6. Return system according to claim 1, in which the elastic means comprises at least two tension springs mounted in parallel.

7. Return system according to claim 6, wherein each tension spring comprises a lower hook which cooperates with recesses made in the plate, said plate being suspended from the tension springs.

8. Hooking device according to claim 1, wherein the load hook is pivotably mounted about a tilting axis and comprises a recess in which a part of the return system is housed, the recess having a length which allows the load hook to be tilted between a closed position and an open position in the presence of the part of the return system in said recess.

9. The hooking device according to claim 1, wherein the load hook is fixed to the crank pin of the return system along an axis offset with respect to the tilting axis of said load hook.

\* \* \* \* \*